United States Patent [19]

Graffagnino

[11] Patent Number: 6,031,937
[45] Date of Patent: Feb. 29, 2000

[54] METHOD AND APPARATUS FOR VIDEO COMPRESSION USING BLOCK AND WAVELET TECHNIQUES

[75] Inventor: Peter N. Graffagnino, San Francisco, Calif.

[73] Assignee: NeXT Software, Inc., Redwood City, Calif.

[21] Appl. No.: 08/247,006

[22] Filed: May 19, 1994

[51] Int. Cl.[7] .................................. G06K 9/36; H04N 7/12
[52] U.S. Cl. ............................................... 382/236; 348/396
[58] Field of Search ...................................... 382/232–253, 382/162, 166, 219–220, 221, 272; 348/384–405; 358/426–433, 261.1; 341/67

[56] References Cited

PUBLICATIONS

Adobe Systems, Inc., "JPEG Technical Specification, Revision 9" May 4, 1991, PostScript® Developer Support Group.

*Primary Examiner*—Jon Chang
*Assistant Examiner*—Jayanti K. Patel
*Attorney, Agent, or Firm*—Hecker & Harriman

[57] ABSTRACT

A method and apparatus are disclosed for symmetrically compressing and decompressing video information in real time by coupling block and wavelet techniques. In the compression pipeline, the image is divided into blocks comprising $2^k \times 2^k$ pixels (in the preferred embodiment, k=1). The average color of each block is computed. The system computes an average luminance for each block and differential luminances of each pixel of the plurality of pixels of each block. A first plurality of frequency details of each block are determined by Haar transforming the differential luminances. The system computes an average color difference between each block and the preceding block, and quantizes the average color difference and the first plurality of frequency details using Lloyd-Max quantization. In an alternate embodiment, skip codes are generated for blocks having the same quantized average color difference and second plurality of frequency details. The quantized average color difference and a second plurality of frequency details are encoded using variable length codes. The system employs lookup tables to decompress the compressed image and to format output pixels. The output of the compression pipeline containing variable length codes is decoded into fixed-length codes, which are then decoded using a first lookup table into three device-independent components that represent each block. The three components index a second lookup table containing precomputed RGB values that include precomputed display dependent formatting to produce the output image. In the alternate embodiment, skip codes contained in the output of the variable length decoder are decoded.

46 Claims, 8 Drawing Sheets

METHOD AND APPARATUS FOR VIDEO COMPRESSION USING BLOCK AND WAVELET TECHNIQUES

BACKGROUND OF THE INVENTION

1. Field of the Invention

The present invention relates to the field of data compression.

2. Background Art

Compression is a scheme for reducing the amount of information required to represent data. Data compression schemes are used, for example, to reduce the size of a data file so that it can be stored in a smaller memory space. Data compression may also be used to compress data prior to its transmission from one site to another, reducing the amount of time required to transmit the data. To access the compressed data, it is first decompressed into its original form. A compressor/decompressor (codec) is typically used to perform the compression and decompression of data. One measure of the performance or efficiency of a codec is its "compression ratio". Compression ratio refers to the ratio of number of bits of uncompressed data to the number of bits of compressed data. Compression ratios may be 2:1, 3:1, 4:1 etc.

Data compression may also be required when the input/output rate of a particular data receiver is less than the data rate of the transmitted data. This can occur when providing video data to computer systems. Video data of frame size 320×240 is provided at rates approaching 7 megabytes per second. This rate is greater than the rate of commonly used I/O subsystems of personal computers. Some representative rates of common I/O subsystems found on personal computers (PC) are:

| | |
|---|---|
| Serial Communications | 1–2 kilobytes/sec; |
| ISDN | 8–16 kilobytes/sec; |
| Ethernet/CD-ROM | 150–300 kilobytes/sec; |
| SCSI Disk | 0.5–2 megabytes/sec. |

Another measure of video codec compression ratio is the average compressed bits-per-pixel. This measure is useful in describing video compression because different conventions are used for calculating the size of uncompressed video, i.e., some use 24 bits-per-pixel RGB and others use 4:2:2 sub-sampled YUV (16-bits per pixel). The averaging accounts for potentially different strategies employed for frames in a sequence. The bandwidth requirements for a sequence of frames is calculated by multiplying the average compressed bits-per-pixel and the number of frames per second, and dividing the resulting product by the number of pixels in each encoded frame.

Nearly all video compression techniques are lossy, i.e., information is inevitably discarded in the compression process. A measure of quality is how much this information is noticed by a human observer. However, there is not a consistent, objective model of human perception that can be applied. A simple, concrete, quality metric that is frequently used is the Mean-Squared-Error (MSE) that measures the error on a per-pixel basis from the uncompressed original.

Most compression algorithms are computationally complex, which limit their application since very complex algorithms often require expensive hardware to assist in the compression. A useful number to measure computational complexity of software-based compression algorithms is MIPS per megapixels/sec, i.e., essentially instructions/pixel. For example, an algorithm just capable of compressing 320×240 pixels per frame at 30 frames per second on a 40 MIPS machine has a computational complexity of 40,000,000/(320×240×30)≅17 instructions/pixel.

Symmetry refers to the ratio of the computational complexity of compression to that of decompression. Codec's are frequently designed with a greater computational load on the compressor than the decompressor, i.e., they are asymmetric. While this may be a reasonable strategy for "create-once, play-many" video sequences, it limits the range of applications for the codecs. Asymmetric compression techniques are not suitable for teleconferencing, for example, since teleconferencing requires essentially real-time processing and substantially equivalent compression and decompression rates.

Block Transform Coding Example (JPEG)

In the prior art, a class of image compressors called Block Transform Coding (BTC) is used. This is a fundamentally symmetric, image-compression technique that is used in (MPEG) and (JPEG) compression algorithms. In BTC, an image is divided into small blocks, the blocks are transformed using an invertible, two dimensional (2-D) mathematical transform, the transformed image is quantized, and the quantized result is losslessly compressed. This process forms the core of JPEG and MPEG compression, which use 8×8 blocks and a Discrete Cosine Transform (DCT) to perform the 2-D transform.

FIG. 1 is a diagram illustrating computational blocks of a prior art system for performing JPEG still-image, compression. Input image 102 is provided to the color-space conversion and subsampling block 110. The output of the color-space conversion and subsampling block 110 is provided to block 112 for dividing each image plane into 8×8 blocks. The output of block 114 is provided to the Discrete Cosine Transform block 114. Block 114 provides DC terms 116 to quantization block 120, which quantizes the DC terms 116 using differential pulse code modulation (DPCM). Block 114 provides AC terms 118 to block 122, which scalar quantizes the AC terms 118 by frequency. The outputs of blocks 120 and 122 are provided to the Huffman block 124, which compresses the quantized values using variable length codes to provide output 126.

Digital images 102 are typically stored in an RGB format, where each pixel is represented as a tuple of red (R), green (G), and blue (B) samples. While RGB format is suited towards most digital color input and output devices, it is not particularly efficient for the human visual system, or natural scenes. For example, in natural scenes the R, G, and B components of colors are highly correlated because most natural colors are very close to shades of gray, where R=G=B (i.e., saturated colors are rare). In other words, with respect to information coding, the correlation between RGB signals means that there is redundant information stored in the R, G, and B channels. To account for this redundant information, color-space conversion and subsampling block 110 transforms the colors of input image 102 into a color space with an explicit brightness, or luminance, dimension prior to compression. More bits are typically used to precisely specify the brightness while relatively fewer bits are used to specify the chrominance.

Broadcast television (TV) uses YUV color space to better utilize the bandwidth of TV's. The YUV color space is essentially a rotation of the RGB basis vectors so that the luminance axis (Y) of YUV color space is aligned with the gray diagonal of RGB color space, which extends from RGB coordinates (0, 0, 0) to (1, 1, 1). The transformation for converting RGB color values to YUV space is expressed by Equation (1):

$$\begin{bmatrix} Y \\ U \\ V \end{bmatrix} = \begin{bmatrix} 0.161 & 0.315 & 0.061 \\ -0.079 & -0.155 & 0.234 \\ 0.330 & -0.227 & -0.053 \end{bmatrix} \begin{bmatrix} R \\ G \\ B \end{bmatrix}. \quad (1)$$

Reduction of redundant information can be achieved using the YUV color-space representation obtained using Equation (1). The human eye is much less sensitive to spatial detail in the U and V channels than it is in the Y channel because receptors in the eye for brightness (Y) are more numerous than those for chrominance (U, V). Using this fact, the U and V components can be sampled at a lower resolution. In JPEG compression, the U and V components are frequently subsampled by a factor of 2 in both x- and y-directions. For example, four Y samples and one sample each of U and V are produced for each 2×2 block of an input image. For 8-bit samples per channel, this effectively produces a 2:1 compression factor. Thus, color-space conversion and subsampling block 110 converts an input image 102 from RGB color space to YUV color space using the transformation of Equation (1) and subsamples the input image 102 to reduce redundant information.

Once block 110 converts the input image 102 to YUV color space and subsamples the U and V planes, the prior art JPEG system of FIG. 1 treats the resulting three image planes (Y, U, and V) independently and codes them as three separate 1-channel images. Subsampling of U and V values reduces the amount of computation performed here as well.

For each of the resulting YUV image planes, block 112 of FIG. 1 segments the image output by color-space conversion and subsampling block 110 into fixed-size tiles, or blocks. In JPEG compression, the image is divided into blocks of 8×8 pixels for a number of reasons. Many transforms have non-linear, computational complexity that is alleviated by small block sizes. For example, the computational complexity of a Discrete Cosine Transform (DCT), described below, is O(nlog(n)). Therefore, transforming small, fixed-sized blocks allows the overall compression algorithm to remain approximately linear in image size. The relatively small blocks localize compression artifacts in an image, i.e., the artifacts from a block that is particularly difficult to compress do not ripple throughout the image. Finally, small, fixed block sizes facilitate easier, hardwired optimization.

Once the image is segmented into 8×8 blocks, a spatial transform is performed on each block. In the prior art JPEG system of FIG. 1, block 116 performs a Discrete Cosine Transform on each block of the three image planes provided by block 112. The DCT of block 114 is lossless resulting in 64 frequency values for each block. The first value produced by block 114 is a DC term 116 that is essentially the average YUV value of an 8×8 block. The remaining values are AC terms 118 that represent edges in the x- and y-directions. The transform "sorts" the block into detail components. Eight-by-eight blocks of an image plane that are relatively smooth have large values for the DC term 116 and lower frequency AC terms 118 and relatively little energy in the higher frequency AC terms 118. Blocks with strong vertical detail have considerable energy in the horizontal frequencies and comparatively little in the vertical.

Once block 114 produces DC term 116 and AC terms 118, DPCM quantization block 120 and scalar quantization block 122 quantize the resulting frequency terms 116 and 118, respectively. The DC term 116 is processed separately. It is not quantized directly, but rather its difference from the DC term of the previous block is quantized by block 120 using Differential Pulse Code Modulation coding, or DPCM. In Block Transform Coding, differential pulse code modulation of the DC term 116 takes advantage of block-to-block color correlations and maintains higher precision for the DC term 116. The low frequencies of AC terms 118 are quantized finely by block 122, since much of the image energy is contained there, and the higher frequencies of AC terms 118 are quantized more coarsely by block 122 using scalar quantization.

In JPEG, variable-length coding block 124 encodes the entropy of DC term 116 and AC terms 118 after quantization by blocks 120 and 122, respectively. The quantized DCT coefficients 116 and 118 are losslessly compressed using a variable-length, Huffman-like code. The quantized DC term 116 is coded individually with a code that is short for small differences and longer for large differences between block values. The sixty-three AC terms 118 are coded into a continuous bitstream, scanned in zig-zag order, with special run-length codes referring to runs of zero. The special treatment of zero-valued AC codes 118 is important because little of the image energy is located in the higher frequency terms of the DCT performed by block 114, and thus there is a high probability that many of the high frequency AC terms 118 are zero.

The prior art JPEG compression has several disadvantages. While the JPEG techniques provides high compression ratios for still-images, it is not suitable for many real-time software-based video applications. JPEG is not capable of providing 320×240×24 fps (or 1.8 Mps) using generally available PC's due to the computational complexity. Because JPEG is a still-image standard, it cannot provide video rate compression with moderate compression using software. Instead, special hardware is required to provide JPEG compression at video rates that can support the above rate of 1.8 Mps. This is due to the computational complexity of performing a Discrete Cosine Transform on an 8×8 block. MPEG compression provides video compression. While MPEG has same basic format as JPEG, it is an asymmetric compression method using special hardware that requires significantly greater compression time than decompression time, and is therefore unsuitable for providing real-time, symmetric video compression and decompression.

SUMMARY OF THE INVENTION

The present invention provides a method and apparatus for symmetrically compressing and decompressing video information in real time by coupling block and wavelet techniques. The present invention performs a wavelet transform on small blocks of an image and encodes the wavelet transformed blocks. The preferred embodiment of the present invention utilizes a block-oriented Haar wavelet transform on 2-by-2 pixel blocks and is useful in a wide variety of video coding applications.

In the compression pipeline, the image is divided into a plurality of blocks, where each block of pixels comprises $2^k \times 2^k$ pixels. In the preferred embodiment of the present invention, k is equal to one. The average color of each block of the plurality of blocks is computed. The present invention computes an average luminance of each block dependent on the average color of each block and a differential luminance of each pixel of the plurality of pixels of each block. A first plurality of frequency details of each block are determined by Haar transforming the differential luminance of each pixel of the plurality of pixels of each block. The first plurality of frequency details comprises an average term, a horizontal term, a vertical term, and a diagonal term. The present invention computes an average color difference between each block and the block that immediately precedes it, and then quantizes the average color difference and the first plurality of frequency details. The average color difference and the first plurality of frequency details are quantized using Lloyd-Max quantization, which is dependent on a variance and a number of reconstruction levels. In an alternate embodiment of the present invention, skip codes are generated when the quantized average color difference and the second plurality of frequency details of the block match those of the corresponding block in a previous frame. The quantized average color difference and a second plurality of frequency details are encoded using variable length codes; the second plurality of frequency details is less than or equal to the first plurality of frequency details. The second plurality of frequency details comprises the horizontal term and the vertical term. In the preferred embodiment of the present invention, the quantized average color and the second plurality of frequency details are encoded using Huffman coding.

The present invention employs lookup tables to decompress video information and to format output pixels. The output of the compression pipeline containing variable length codes is first decoded into fixed-length codes. The fixed-length codes are then decoded into five device-independent components that represent a 2×2 block using a first lookup table. The five components hCode, vCode, and a set of three compVals (RGB, described below) are provided as indices to a second lookup table containing precomputed values of R, G, and B components. The R, G, and B components of the second lookup table include precomputed display dependent formatting to produce the output image. In an alternate embodiment, skip codes contained in the output of the variable length decoder are decoded. Thus, the operations of reconstruction, inverse Haar transform, clamping, and dithering are reduced to a few table lookups. The per-pixel operation count is only 5–6 operations per pixel.

DETAILED DESCRIPTION OF THE INVENTION

Figure 1:
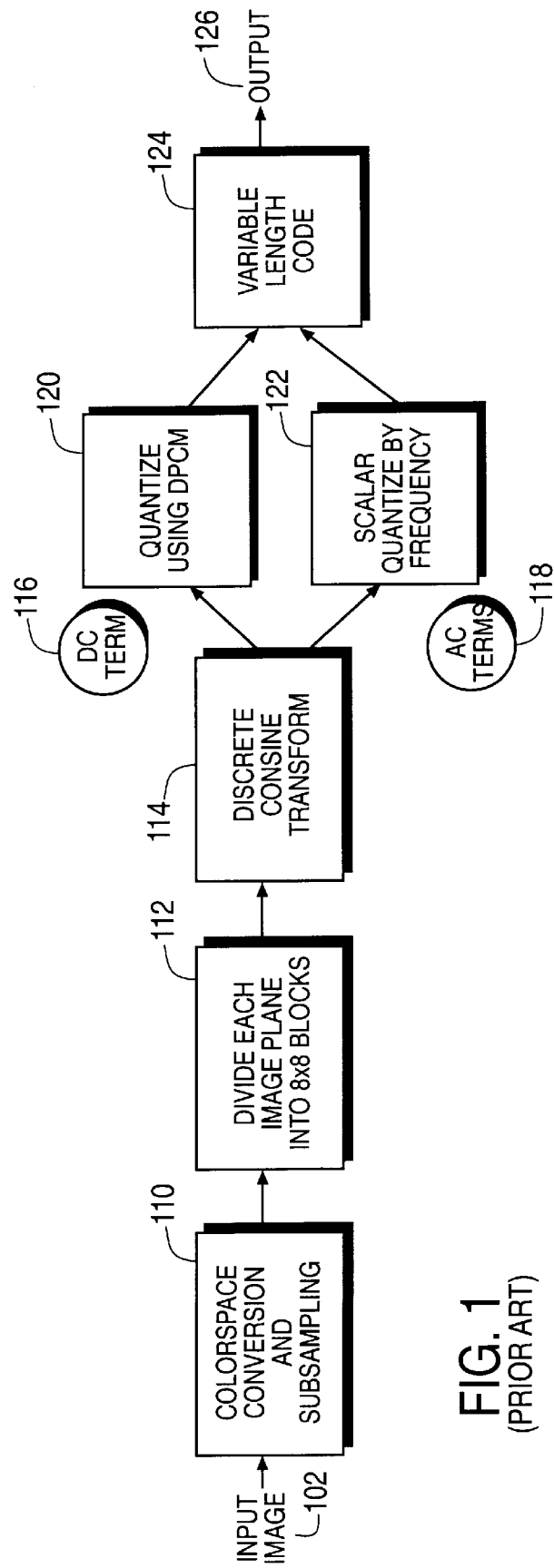
FIG. 1 is a diagram illustrating a prior system implementing JPEG compression.

The present invention provides a method and apparatus for compressing video information using microwavelets. In the following description, numerous specific details, such as block sizes, color spaces, etc., are described in detail to provide a more thorough description of this invention. It will be apparent, however, to one skilled in the art, that the invention may be practiced without these specific details. In other instances, well known features have not been described in detail so as not to unnecessarily obscure the present invention.

The present invention symmetrically compresses and decompresses video information in real-time by effectively coupling block techniques with wavelet techniques. The present invention performs a wavelet transform on small blocks of an image and encodes the wavelet transformed blocks in a highly efficient manner. Thus, the present invention is a real-time, symmetric compressor/decompressor scheme that utilizes a block-oriented Haar wavelet transform on 2-by-2 pixel blocks, in the preferred embodiment, which provides desired performance and compression ratios.

The video compression scheme of the present invention is a high performance, moderate bit-rate, video compression technique that offers significant advantages over prior art software compression technologies and is useful in a wide variety of video coding applications. Unlike many other prior art video-compression technologies that are software-based, the compressed video of the present invention can be compressed and decompressed in real time using commonly available processing means used in personal computers (PC).

The present invention provides symmetrical compression and decompression that are on the same order of magnitude in computational complexity with modest compression rates. It provides compression ratios of 1.5–2.5 bits per pixel. Further, the present invention plays back video information at 320×240×24 fps (or 1.8 Mps) using PC's and provides high quality video. The advantages of the present invention make it suitable for a wide range of applications. Since the technique is symmetrical, applications such as teleconferencing are enabled. Further, it provides the advantages of asymmetric software approaches with respect to decompression.

BTC Approach of the Present Invention

The basic approach of the present invention is to provide an improved coding approach based on the Block Transform Coding so that real-time software compression and decompression are feasible. To meet performance goals, the present invention processes each pixel of an image using less than 20 operations per pixel. In order to provide real-time compression/decompression, a YUV transform as taught in the prior art is not performed. For playback, the prior art YUV-to-RGB conversion requires five multiplications and four additions, not including output formatting (dithering) as well as memory loads and stores. Thus, the conversion uses essentially half of the computational budget of 20 operations per pixel.

Another consideration affecting decoding time is output formatting. The target playback platforms may have various display formats: 24-bit RGB, 15-bit RGB, 8-bit grayscale, etc. For example, a common color display used is 12-bit RGB. To provide suitable image quality, the present invention dithers the device independent compressed video information. That is, the compressed data of the present invention is not dependent on a particular display format. Thus, even an optimized 24-bit to 12-bit RGB dithering conversion typically requires 10 operations per pixel. It is accordingly apparent that color-space conversion and dithering can consume the entire computational budget. Therefore, as described below, the present provides precomputed output formatting incorporated in lookup tables used to decompress encoded video information.

Figure 2:
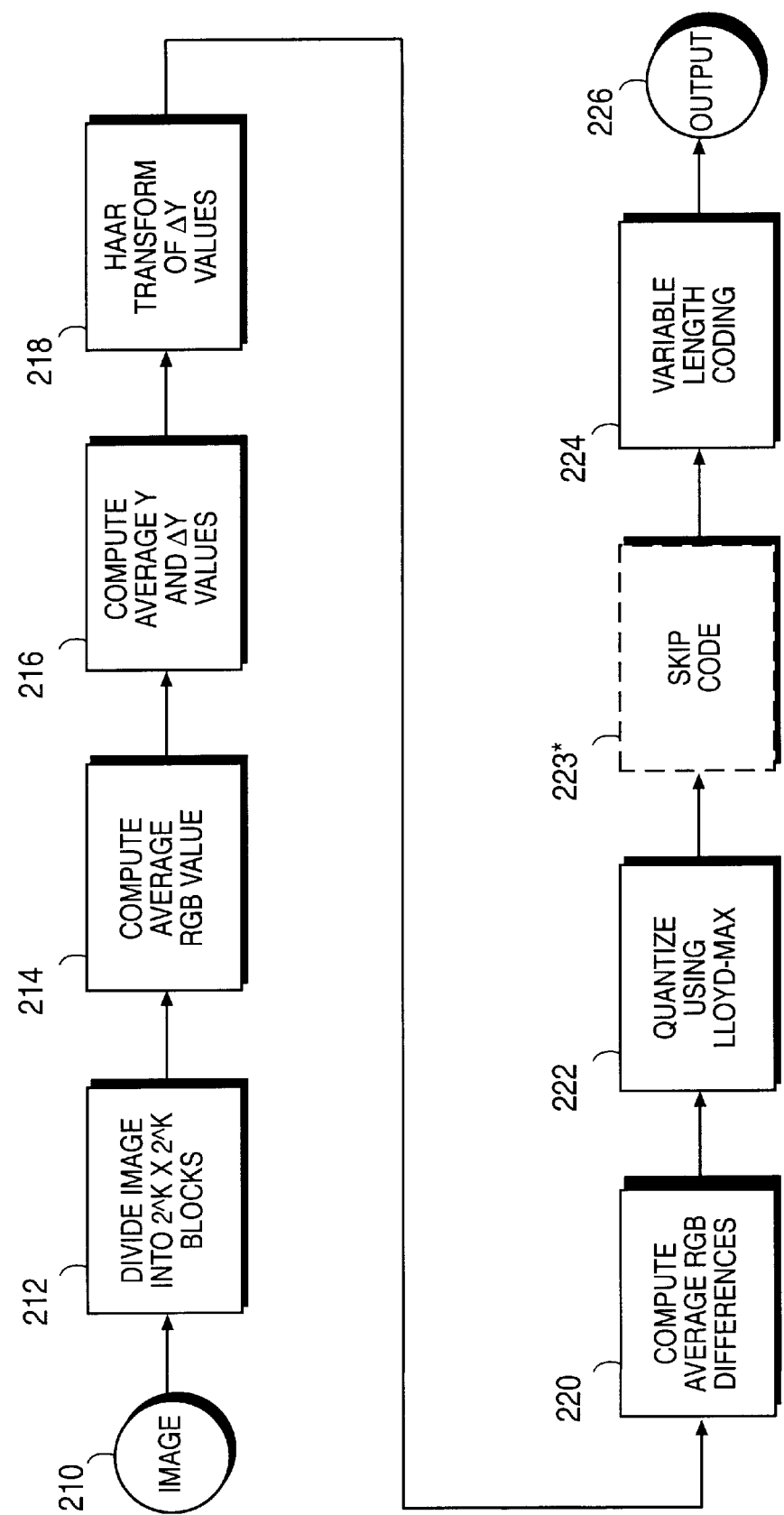
FIG. 2 is a diagram illustrating the compression pipeline of the present invention.

FIG. 2 is a diagram illustrating the compression pipeline of the present invention for compressing video information using wavelets. An RGB image 210 is provided as input to block 212, which divides the image into $2^k \times 2^k$ blocks. In the preferred embodiment, k is equal to one, i.e., 2×2 blocks are used. The 2×2 blocks are output to block 214, which computes the average RGB value ($R_{avg}$, $B_{avg}$, and $G_{avg}$) of each 2×2 block. The output of block 214 is coupled to the input of block 216, which computes the average luminance value $Y_{block}$ of each 2×2 block and the differential luminances ΔY for each pixel of a block, described below.

The output of block 216 is coupled to the input of Haar transformation block 218, which performs a Haar transform of the ΔY values of each 2×2 block. The output of Haar transform block 218 is coupled to the input of block 220 for computing the differences ($\Delta R_{avg}$, $\Delta B_{avg}$, and $\Delta G_{avg}$) between the average RGB values of the present 2×2 block and the average RGB values of the previous 2×2 block.

The output of block 220 is coupled to the input of Lloyd-Max quantization block 222, which quantizes the Haar transform values $H2_{hor}$, $H3_{ver}$, and H4dia (described below) and the RGB differences $\Delta R_{avg}$, $\Delta B_{avg}$, and $\Delta G_{avg}$. The output of Lloyd-Max quantization block 222 is coupled to the input of variable-length coding block 224. In the preferred embodiment of the present invention, Huffman coding is implemented to perform variable length encoding of the six data $H2_{hor}$, $H3_{ver}$, $H4_{dia}$, $\Delta R_{avg}$, $\Delta B_{avg}$, and $\Delta G_{avg}$ representing each 2×2 block to produce output 226.

In FIG. 2, skip code block 223 may be inserted between the output of block 222 and variable-length coding block 224. The skip code block 223 is indicated by an asterisk beside the numeral 223 and the block itself is dashed instead of solid. In a first embodiment for producing symmetrically compressed still-images, the output of Lloyd-Max quantization block 222 is coupled to the input of variable length coding block 224 to produce output 226, while in a second embodiment, skip code block 226 is inserted between the two blocks to provide temporal compression of video information using skip codes, described below.

The present invention works on image blocks of 2×2 pixels. Block 212 parses the input image 210 into $2^k \times 2^k$ blocks of pixels. For each 2×2 block, block 214 computes a full-precision, average (DC) RGB value, i.e., $R_{avg}$, $G_{avg}$, and $B_{avg}$, to represent its color value. In block 216, unlike the prior art, the present invention does not use a full YUV-to-RGB conversion in block 216. Instead, block 216 uses a modified YUV-to-RGB technique that retains the compression advantages of treating luminance and chrominance information differently. As described below, lookup tables and a small block size are used, thereby allowing output formatting to be precomputed in lookup tables and not calculated for each pixel.

Figure 4:
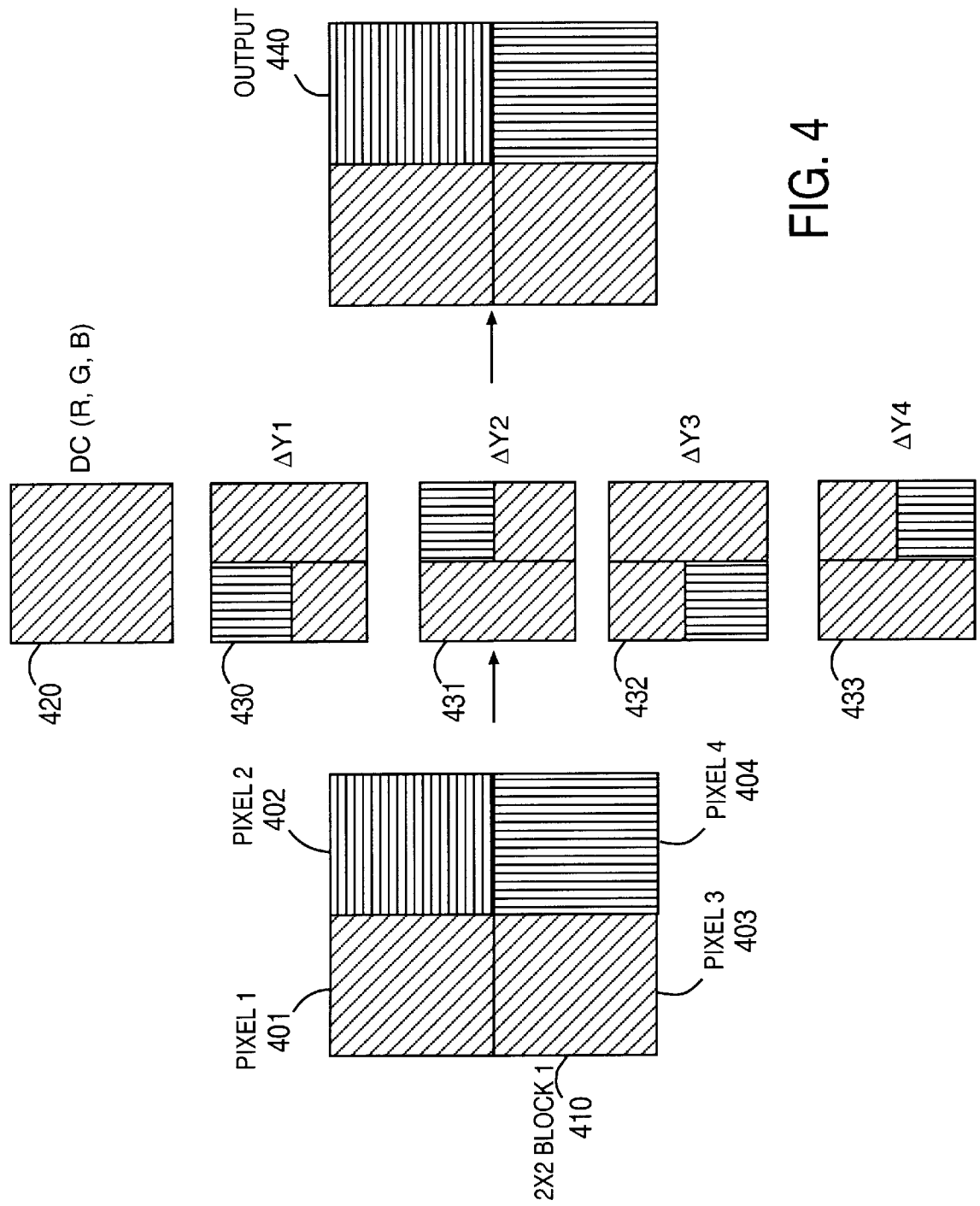
FIG. 4 is a diagram illustrating the seven components representing a 2×2 block that are produced by blocks 214 and 216 of FIG. 2 in the compression pipeline of the present invention.

FIG. 4 is a diagram illustrating the seven components representing a 2×2 block that are produced by blocks 214 and 216 in the compression pipeline of the present invention. The 2×2 block 410 comprising pixel1 401, pixel2 402, pixel3 403, and pixel4 404 is produced by block 212 from input image 210. The 2×2 block is provided to block 214, which produces DC RGB value 420. While DC RGB value 420 is represented as a single block in FIG. 4, it should be apparent that DC RGB value 420 comprises three components, i.e., an $R_{avg}$, $G_{avg}$, and $B_{avg}$ component. The 2×2 block 410 and DC RGB value 420 are provided to block 216, which computes $Y_{block}$ value and the ΔY's. In FIG. 4, ΔY1 430, ΔY2 431, ΔY3 432, and ΔY4 433 represent the differential luminances between each particular luminance value of a pixel and the average luminance value $Y_{block}$. The respective differential luminances are indicated in the diagram by a corresponding lighter colored block within the larger block. Thus, the differential luminance ΔY1 is indicated by lightened block 430 in the upper left hand portion of the block (illustrated below DC RGB block 420) corresponding to the position of pixel1 401 of 2×2 block 410. The ΔY2 431, ΔY3 432, and ΔY4 433 values are illustrated in the upper right, lower left, and lower right portion of blocks (illustrated in descending order below the block containing ΔY1 430), respectively. Output 440 illustrates the 2×2 block 410 as represented by DC RGB block 420, ΔY1 430, ΔY2 431, ΔY3 432, and ΔY4 433 produced by blocks 214 and 216.

The term ΔY is the luminance Y difference between each pixel and the average luminance $Y_{block}$ for the corresponding block, i.e., $\Delta Y_1 = Y_1 - Y_{block}$. Effectively, this block structure is equivalent to chroma subsampling by a factor of two in the x- and y-directions. Only luminance Y information is available on a per-pixel basis, and full color information is only present on a per-block basis: $\Delta Y_1$, $\Delta Y_2$, $\Delta Y_3$, $\Delta Y_4$, $R_{avg}$, $G_{avg}$, and $B_{avg}$. At the output of block 216, seven components, or bytes, remain to represent the block, which is down from the original 4 pixels×3 bytes per pixel=12 bytes of the original RGB image for 24-bit RGB color. Using this approach, the present invention maintains the compression advantages of a YUV-pixel transformation and U, V subsampling without explicitly performing it on a per-pixel basis.

Once the blocks are preprocessed, as described above, the number of components is additionally reduced by performing a simple, two-dimensional transform of the ΔY values. The two-dimensional transform is performed on the luminance values instead of the full precision color of pixels. For the two-dimensional transform, the present invention performs a $2^k$-by-$2^k$ Haar transform (a second-order wavelet transform) that is very fast when applied to $2^k$-by-$2^k$ blocks. In block 218 of FIG. 2, a Haar transform of ΔY values of each 2×2 block is performed. Within the 2×2 block, only AC luminance variations (i.e., ΔY's) are encoded. In the present invention, the transform involves values for $2^k=2, 4, 8$, etc., where a low integer for k is preferred. In the preferred embodiment of the present invention, the integer k is equal to one (i.e., $2^k=2$), so that the wavelet transform is performed on blocks of 2×2 pixels as follows in Equation (2):

$$\begin{bmatrix} H1_{avg} \\ H2_{hor} \\ H3_{ver} \\ H4_{dia} \end{bmatrix} = \begin{bmatrix} 1 & 1 & 1 & 1 \\ 1 & 1 & -1 & -1 \\ 1 & -1 & 1 & -1 \\ 1 & -1 & -1 & 1 \end{bmatrix} \begin{bmatrix} \Delta Y_1 \\ \Delta Y_2 \\ \Delta Y_3 \\ \Delta Y_4 \end{bmatrix}. \quad (2)$$

Because the initial ΔY's are the differences $\Delta Y_1 - \Delta Y_4$ between the luminance $Y_1 - Y_4$ of each corresponding pixel and the average luminance $Y_{block}$ for the 2×2 block, the first term $H1_{avg}$ of the transform is always equal to zero. Therefore, it is unnecessary to store this transform term. The second term $H2_{hor}$ and the third term $H3_{ver}$ of the transform are the horizontal- and vertical-edge components of the 2×2 block, respectively. The last term $H4_{dia}$ is the diagonal-edge component of the 2×2 block. Using the Haar transform, an additional component is eliminated (i.e., $H1_{avg}$), and six components (each one byte) averages.

Figure 5:
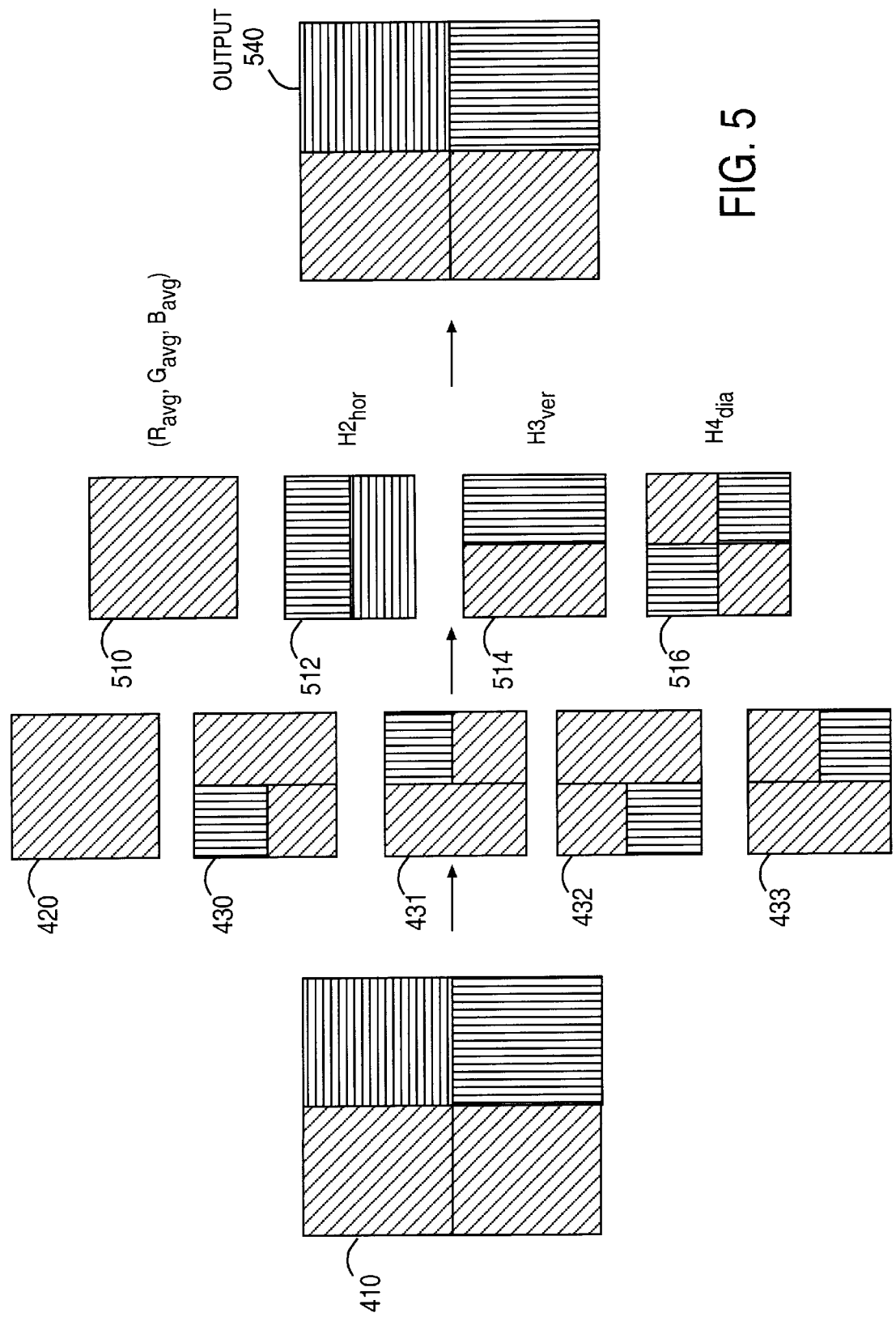
FIG. 5 is a diagram illustrating the six components representing a 2×2 block that are produced by blocks 214, 216, and 218 in the compression pipeline of the present invention.

FIG. 5 is a diagram illustrating the six components representing a 2×2 block that are produced by blocks 214, 216, and 218 in the compression pipeline of the present invention. The 2×2 block 410 is produced by block 212. The second column contains the seven components DC RGB block 420, $\Delta Y1$ 430, $\Delta Y2$ 431, $\Delta Y3$ 432, and $\Delta Y4$ 433 produced by blocks 214 and 216 and provided at the output of block 216 in the compression pipeline, as described above with respect to FIG. 4. A two-dimensional transform given by Equation (1) is performed in block 218 on the $\Delta Y1$ 430, $\Delta Y2$ 431, $\Delta Y3$ 432, and $\Delta Y4$ 433 values to produce $H1_{avg}$, $H2_{hor}$, $H3_{ver}$, and $H4_{dia}$. As described above, the $H1_{avg}$ is eliminated. The third column illustrates the six components representing block 210 at the output of Haar transform block 218. Three components encode the DC RGB value 510; it should be understood that DC RGB value 510 has the same values as the RGB values of DC RGB value 420 shown in column 2 and renumbered here for purposes of illustration. Block 512 represents the $H2_{hor}$ term, block 514 represents the $H3_{ver}$ term, and block 516 represents the $H4_{dia}$ term. Output 540 illustrates the 2×2 block 410 as represented by DC RGB block 510 produced by block 214 and $H2_{hor}$, $H3_{ver}$, and $H4_{dia}$ terms 512, 514, and 516 produced by Haar transform block 218.

In block 220 of FIG. 2, the differences between the average RGB values ($\Delta R_{avg}$, $\Delta G_{avg}$, and $\Delta B_{avg}$) of the present 2×2 block and the previous one are computed. This exploits the block-to-block coherence of DC RGB values and makes all six block components difference-based, i.e., $H2_{hor}$, $H3_{ver}$, $H4_{dia}$, $\Delta R_{avg}$, $\Delta G_{avg}$, and $\Delta B_{avg}$. The most common DC RGB difference value for all 2×2 blocks of an image is zero.

After the Haar transform is applied to the 2×2 blocks of the image and the DC RGB differences are calculated, each of the six data components (i.e., $\Delta R_{avg}$, $\Delta G_{avg}$, $\Delta B_{avg}$, $H2_{hor}$, $H3_{ver}$, and $H4_{dia}$) are quantized individually in block 220 of FIG. 2. Because each component is based on a difference between two correlated values, the distribution of values is expected to be roughly Laplacian, i.e., it has a sharp peak at zero (the most probable value) and exponentially falls off in a symmetric manner on either side of the origin. The Laplacian distribution is described by a single parameter, σ, which is the variance of the distribution. A standard value of σ for each of the six components of a 2×2 microwavelet block was heuristically determined using a set of test images. The distributions are optimally quantized dependent on these standard σ values using the Lloyd-Max quantization technique in block 220 of FIG. 2. The Lloyd-Max technique calculates decision points and reconstruction values dependent on a Laplacian distribution, the value of σ, and the desired number of reconstruction levels. Because zero is the most common value in the distributions, zero-centered, symmetric, reconstruction values having an odd number of levels is used. For example, Table 1 lists the data quantizers used in the present invention with 2×2 microwavelet blocks:

TABLE 1

|  | Number of Reconstruction Levels | Variance | Decision Points | Reconstruction Points |
|---|---|---|---|---|
| $\Delta R_{avg}$ | 13 | 13.4 | ±2, ±7, ±17, ±30, ±47, ±67, ±128 | 0, ±4, ±11, ±23, ±38, ±56, ±78 |
| $\Delta G_{avg}$ | 15 | 13.4 | ±1, ±3, ±8, ±17, ±30, ±46, ±66, ±128 | 0, ±1, ±5, ±12, ±23, ±37, ±55, ±77 |
| $\Delta B_{avg}$ | 13 | 13.4 | ±2, ±7, ±17, ±30, ±47, ±67, ±128 | 0, ±4, ±11, ±23, ±38, ±56, ±78 |
| $H2_{hor}$ | 5 | 11.7 | ±4, ±18, ±128 | 0, ±9, ±27 |
| $H3_{ver}$ | 5 | 11.7 | ±4, ±18, ±128 | 0, ±9, ±27 |
| $H4_{dia}$ | 1 | 5 |  | 0 |

In Table 1, there is only one quantization level for the $H4_{dia}$ diagonal-edge component. Since this component is not common, the present invention assumes that the $H4_{dia}$ component is equal to zero. Thus, only five components are used to represent the 2×2 microwavelet block: $\Delta R_{avg}$, $\Delta G_{avg}$, $\Delta B_{avg}$, $H2_{hor}$, and $H3_{ver}$. The five components are output by Lloyd-Max quantization block 222 of FIG. 2 as a 16-bit code, described below.

Figure 3:
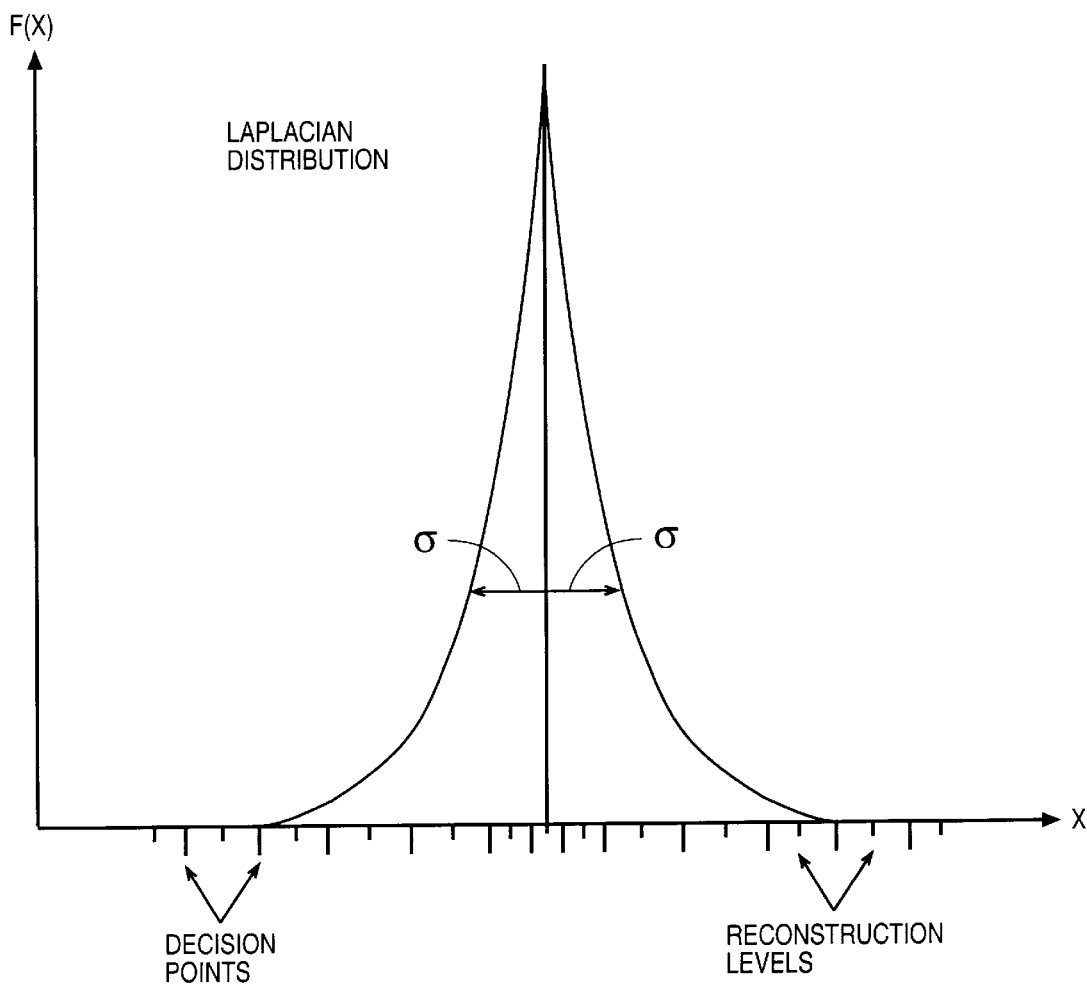
FIG. 3 is a diagram illustrating a Laplacian distribution according to the present invention.

FIG. 3 is a diagram illustrating a Laplacian distribution according to the present invention including decision points and reconstruction levels. Table 1 lists decision and reconstruction points for $\Delta R_{avg}$, $\Delta G_{avg}$, $\Delta B_{avg}$, $H2_{hor}$, $H3_{ver}$, and $H4_{dia}$. The Laplacian distribution is fully characterized by a value for the variance σ, as indicated in the third column of Table 1. The Laplacian distribution is centered on a mean value of zero in each case. The diagram illustrates the decision points and reconstruction levels for quantizing a data term. The horizontal axis of FIG. 3 illustrates decision points to the left of the distribution mean while reconstruction levels are illustrated to the right of it. The values for decision points and reconstruction levels for each data term are listed in columns 4 and 5, respectively, for a variance value σ and a known number of reconstruction levels.

In the present invention, the reconstruction levels of Lloyd-Max quantization block 222 are chosen so that the total number of reconstruction levels for a given 2×2 microwavelet block can be stored in two bytes, i.e., $2^{16}$=65536 levels. By multiplying out the total number of reconstruction levels from each row in the chart (13×15×13×5×5×1= 63375), it is apparent that the 2×2 block can be stored in two bytes. Thus, the four pixels of a 2×2 block are effectively compressed into a 16-bit code output by block 222, compressing each pixel into 4-bits per pixel. Approximately 2000 extra 16-bit codes remain unused in the code space that can be used for further compression, described below.

Figure 6:
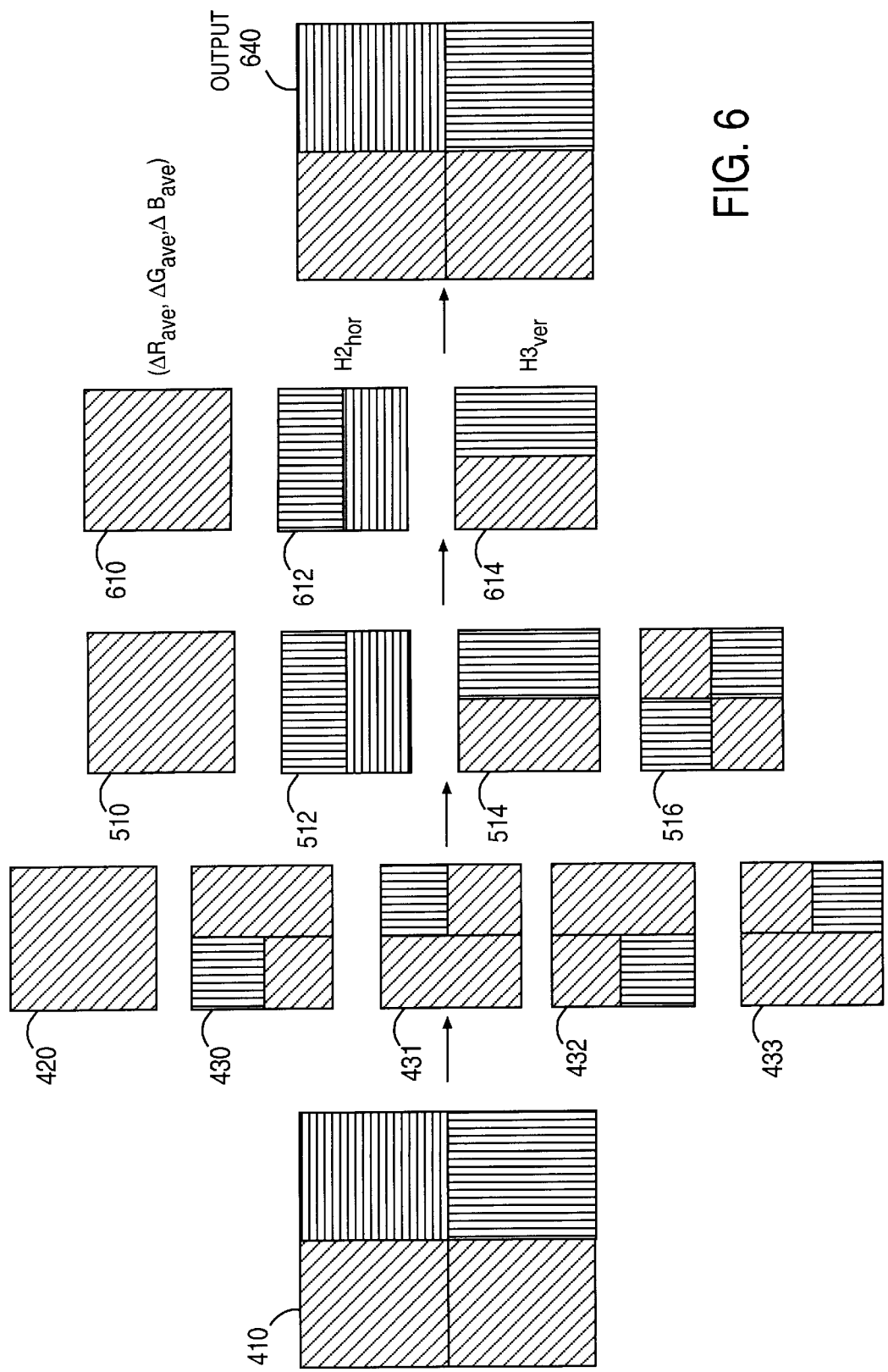
FIG. 6 is a diagram illustrating the five components representing a 2×2 block that are produced by blocks 214, 216, 218, 220 and 222 in the compression pipeline of the present invention.

FIG. 6 is a diagram illustrating the five components representing a 2×2 block that are produced by blocks 214, 216, 218, 220 and 222 in the compression pipeline of the present invention. The 2×2 block 410 is produced by blocks 212. The second column contains the seven components DC RGB block 420, $\Delta Y1$ 430, $\Delta Y2$ 431, $\Delta Y3$ 432, and $\Delta Y4$ 433, as described above with respect to FIG. 4. The third column contains the six components DC RGB block 510 and the $H2_{hor}$, $H3_{ver}$, and $H4_{dia}$ terms 512, 514, and 516, as described above with respect to FIG. 5. The differential DC RGB values 610 are determined in block 220 and the six difference values are quantized in the Lloyd-Max quantization block 222. Further, the H4$_{dia}$ is eliminated from the output since it has only a single reconstruction level. The fourth column illustrates the five components representing 2×2 block 410 at the output of Lloyd-Max quantization block 222. Three components encode the difference DC RGB values 610 ($\Delta R_{avg}$, $\Delta G_{avg}$, and $\Delta B_{avg}$) produced by block 220 and quantized by Lloyd-Max quantization block 222 of FIG. 2. Block 612 represents the quantized H2$_{hor}$ term and block 614 represents the quantized H3$_{ver}$ term output by Lloyd-Max quantization block 222. Output 640 illustrates the 2×2 block 410 as represented by quantized differential DC RGB values 610 ($\Delta R_{avg}$, $\Delta G_{avg}$, and $\Delta B_{avg}$) and the quantized H2$_{hor}$ and H3$_{ver}$ terms 612 and 614 at the output of Lloyd-Max quantization block 222.

The next stage in the compression pipeline of the present invention is to compress the 16-bit block codes losslessly via variable-length Huffman codes in block 224 of FIG. 2. The output of Lloyd-Max quantization block 222 is coupled to variable-length coding block 224. Because each of the five components ($\Delta R_{avg}$, $\Delta G_{avg}$, $\Delta B_{avg}$, H2$_{hor}$, and H3$_{ver}$) of the microwavelet-block code is strongly biased towards zero, the resulting 16-bit codes output by Lloyd-Max quantization block 222 are distributed in a highly non-uniform manner. A canonical code-word probability distribution and the corresponding Huffman codes were heuristically determined using test images in the preferred embodiment of the present invention. The variable-length Huffman coding of block 224 provides another compression factor of 2–3 to produce output 226. Thus, the present invention using microwavelets provides a compression rate of 1.5–2.5 bits per pixel at block 224, which yields a compression ratio between 9.6:1 and 16:1.

Temporal Compression of the Present Invention

To provide temporal compression, the present invention uses skip codes in block 223, which is indicated with a dashed line. Skip codes are inserted by the block encoder of the present invention in block 226 whenever it is determined that a 2×2 microwavelet block of a frame is sufficiently similar to the corresponding 2×2 microwavelet block of the previous frame. The present invention uses a number of codes of the extra 2000 codes in the upper portion of the code space. There is a code to skip one block, another to skip two blocks, and so on. These codes are then passed through the Huffman stage 224 as normal 2×2 microwavelet block codes. When skip codes are present, Huffman tables include their probability.

Decompression

The present invention provides a particularly efficient software implementation for performing video decompression. Since the block code only comprises 16 bits, the present invention is able to employ a lookup table to decode the block directly into its separate components. Further, tables can be used to precompute the dithered display pixels from the component values. Dithering is required to reduce the effects of quantization noise produced when converting from a device independent color format to a device dependent format. For instance, when converting from 24-bit RGB to 12-bit RGB values, dithering is used to reduce quantization noise. The present invention advantageously folds the dithering into decompression lookup table entries. That is, the dithering effects are precomputed and do not have to be calculated during decompression of the present invention. The decompression algorithm is described below.

Figure 8:
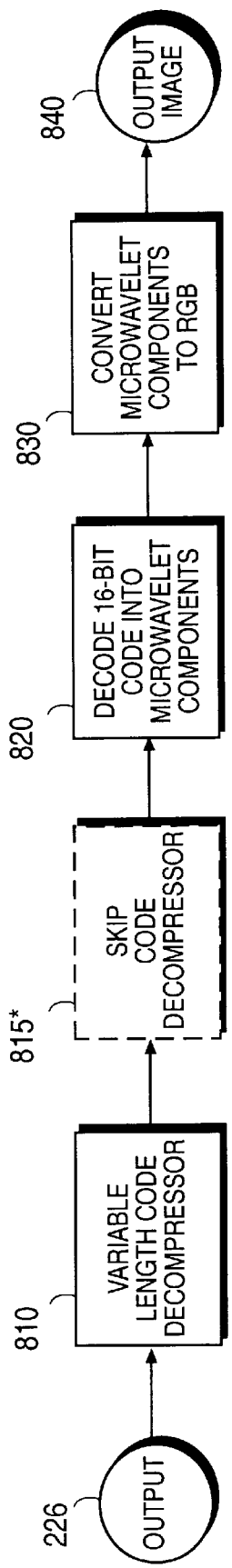
FIG. 8 is a diagram illustrating the decompression pipeline of the present invention.

FIG. 8 is a diagram illustrating the decompression pipeline of the present invention for decompressing video information using wavelets. The compressed image 226 is provided as input to a variable length code decompressor 810, which decodes the variable length codes of output 226 into fixed-length, 16-bit codes. In the preferred embodiment, block 810 is a Huffman decoder. The output of block 810 is provided to block 820, which decodes the fixed-length code into five device-independent components that represent a 2×2 block using a first lookup table. The five components hCode, vCode, compVal$_r$, compVal$_g$, and compVal$_b$ (described below) are provided to block 830 as indices to a second lookup table in block 830. In block 830, the components output by block 820 are used to index lookup table entries containing precomputed values of R, G, and B components. The R, G, and B components of the second lookup table include precomputed display dependent formatting to produce output image 840. In FIG. 8, skip code decoder 815 may be inserted between the output of block 810 and 16-bit decoding block 820. The skip code decoder 815 is indicated by an asterisk beside the numeral 815 and the block itself is dashed instead of solid.

Figure 7:
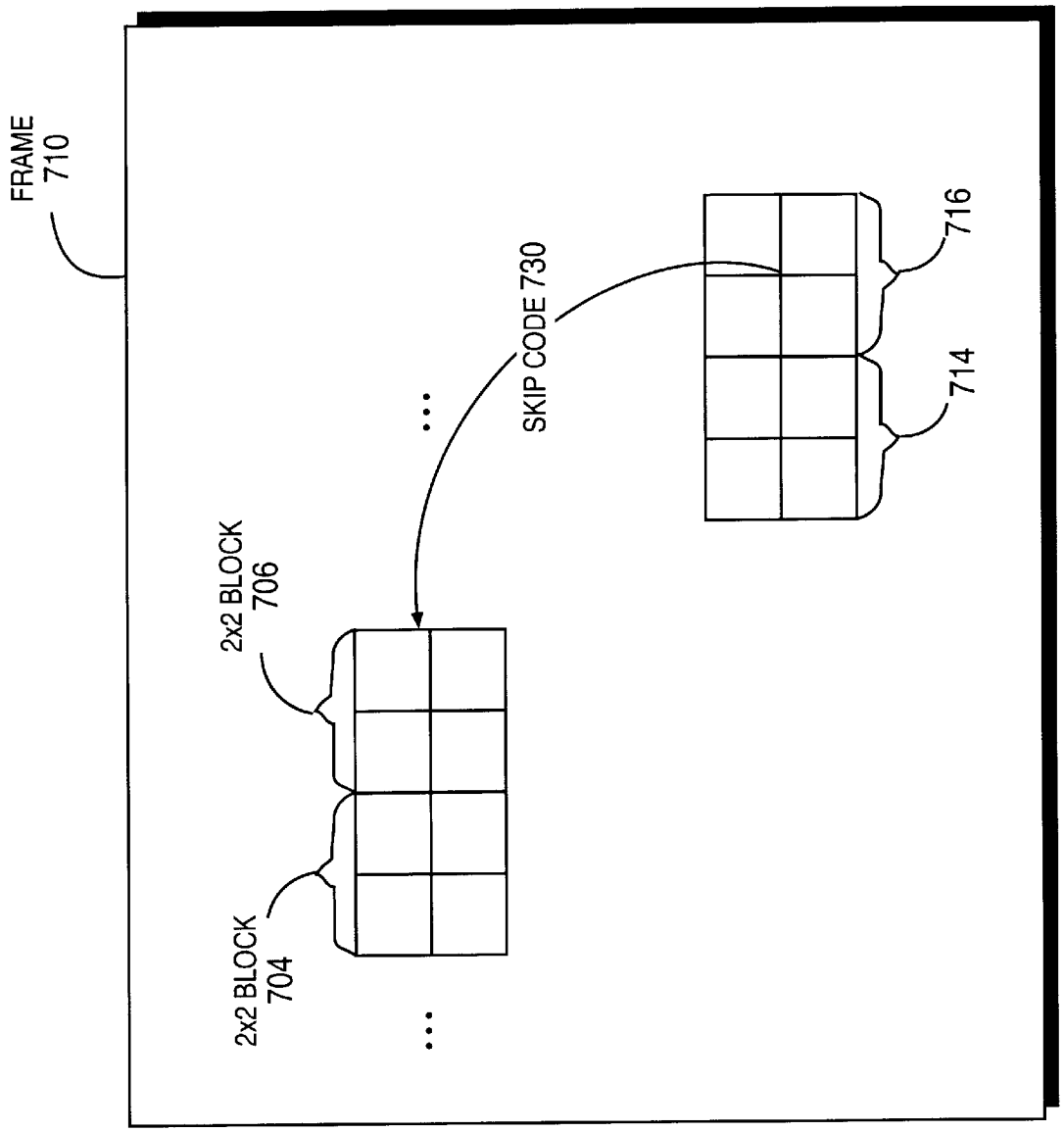
FIG. 7 is a diagram illustrating four microwavelet blocks of an image frame including a skip code.

The output 226 of the compression pipeline is first Huffman decoded. That is, the variable length codes of output 226 are decompressed to produce 16-bit fixed length microwavelet block codes. In the embodiment of the present invention using skip code block 223 in the compression pipeline of FIG. 2, the skip codes incorporated in the 16-bit fixed length microwavelet block codes are decompressed. In a simple skip code embodiment of the present invention, the skip code references a previously processed microwavelet block that is copied to the present frame. When the skip code references a microwavelet block code in a relatively distant location in a video frame, artifacts may be introduced at the present block location in the decompressed video frame since the DC RGB value of the microwavelet block immediately preceding the present microwavelet block may have a significantly different value than that of the DC RGB value of the preceding block of the skip-code referenced block. This is due to the differential encoding of the DC RGB values. FIG. 7 is a diagram illustrating four microwavelet blocks 704, 706, 714, and 716 of image frame 710. The currently processed microwavelet block 716 is represented by a skip code 730 referencing 2×2 block 710. An artifact in the decompressed frame may be introduced since the DC RGB value of 2×2 block 716 is dependent upon the DC RGB value of 2×2 block 714, whereas that of 2×2 block 706 is dependent upon the DC RGB value of 2×2 block 704. In another embodiment of the present invention, repeat skip codes may be practiced that reduces the effects of overshoot in the DC RGB value of a 2×2 block encoded with a skip code.

In the entropy decoding block 810 of FIG. 8, tables are also used to optimize the variable-length Huffman decoding. The present invention ensures that there are no Huffman codes larger than 16-bits. This allows the present invention to perform a lookup on the next 16 bits of the code stream to determine which Huffman code is present. The lookup operation also specifies how many bits were used from the 16 input bits. A special escape code is reserved and all rare codes for which a normal Huffman code would use more than 16-bits. All rare codes are mapped to the escape code, and their decoded value is encoded literally in the bitstream after the escape code. One useful optimization of this approach allows more than one block code to be recovered per Huffman lookup. Often, the 16 input bits actually contain two or more Huffman codes, and this is handled by each table entry containing a list of output codes. This optimization also permits a Huffman encoder to use "pair codes" where one Huffman code corresponds to two decoded values.

In the present invention, two tables are used to decompress the output of the Huffman decoder 810 (or the skip code decompressor in the alternate embodiment): a decodeTable and a packTable. The decodeTable of block 820 in FIG. 8 is a 63375 entry lookup table having one entry for each block code, which produces a (quintuple) of values that represent the 2×2 block. The table entries in the decodeTable are small structures decoding the five microwavelet components of the 2×2 block. The packTable of block 830 is indexed by a triplet of values produced from the decodeTable: hCode, vCode, and compVal. The value hCode is the quantization index for the $H2_{hor}$ component of the block; it has a value ranging from 0–4. Similarly, the value vCode is a quantization index of the vertical Haar wavelet component $H3_{ver}$; it also has a value ranging from 0–4. The twenty-five possible combinations of (vCode, hCode) completely define the luminance detail of the 2×2 block. The value compVal is a scalar R, G, or B component value expressed in a range from 0–128. Because of the DPCM approach used in encoding the DC RGB components, the actual decoded values can overflow the 0–128 range. For this reason the packTable actually has 192 compVal entries and can be indexed from −32 to 160. Thus the total number of entries in the packTable is equal to 5×5×192=4800 entries. Each element in the packTable contains red, green, and blue pre-formatted 2×2 output pixels. The component values are pre-shifted so that the component pixels can be logically OR'ed together to create an output pixel. Since the entries in the packTable completely specify the subblock variations, both dithering and edge-term reconstruction (inverse Haar transform) are precomputed in the table.

Table 2 illustrates code written in the C programming language for 2×2 block decoding into 16-bit RGB pixels:

TABLE 2

```
for (row =hi->height>>1; row != 0; row--) {
    dr = (int) &packTable;
    dg = sizeof(packTableEntry);
    db = sizeof(packTableEntry);
    for (col = hi->width>>1; col != 0; col--) {
        Decode Entry *d;
        d = &decodeTable[*input++];
        packOffset = (uint *) d->e;
        dr += d->r;
        packOffset = (int *) ((int) packOffset +dr);
        p12 = *packOffset;
        p34 = *(packOffset + 1);
        dg += d->g;
        packOffset = (int *) ((int) packOffset +dg);
        p12 I = *packOffset;
        p34 I = *(packOffset +1);
        db += d->b;
        packOffset = (int *) ((int) packOffset + db);
        p12 I = *packOffset;
        p34 I = *(packOffset +1);
        *outrow1++ = p12;
        *outrow2++ = p34;
    }
    outrow1 = (uint *) ((int) outrow1 +OutRowBytes);
    outrow2 = (uint *) ((int) outrow2 +OutRowBytes);
}
```

In Table 2, the loop constructs two output 32-bit words: p12 and p34. The word p12 is the top two 16-bit pixels of the block, i.e., pixels 1 and 2 which are the upper left and upper right pixels, respectively. The word p34 is the bottom two pixels accordingly. The pixels are constructed by OR'ing together component values fetched from the packTable. The decodeTable stores a single index, d->e, for the edge-terms; the index is basically a number ranging from 0–24 and scaled up by 192, i.e., d->e=hCode×vCode×192. The single index d->e is the starting point of the area in the packTable corresponding to the component values for a 2×2 block. These twenty-five cases completely determine the sub-block detail. Also, the tracking variables dr, dg, and db actually track pointer indexes into the packTable in such a way that a single addition moves from the decoded red value entry in the packTable to the green value, and so on. This is accomplished by constructing the decodeTable entries as follows in Equations (3)–(5):

$$d\text{->}r=\Delta R_{avg}*\text{sizeof(packTableEntry)}, \qquad (3)$$

$$d\text{->}g=(\Delta G_{avg}-\Delta R_{avg})*\text{sizeof(packTableEntry), and} \qquad (4)$$

$$d\text{->}b=(\Delta B_{avg}-\Delta G_{avg})*\text{sizeof(packTableEntry)}. \qquad (5)$$

Thus, through the use of tables, the operations of reconstruction, inverse Haar transform, clamping, and dithering are reduced to a few table lookups. The per-block operation count for the loop illustrated in Table 2 is about 20–25 operations. Since the loop emits a four-pixel block, this is only 5–6 operations per pixel, well within the computational budget. However, entropy decoding must still be considered.

Thus, a method and apparatus for compressing video information that provides real-time symmetry and effectively couples block techniques with wavelet techniques are described.

What is claimed is:

1. A method for compressing an image of a first color space, wherein said image is divided into a plurality of blocks, comprising the steps of:

computing an average color of a block of said plurality of blocks, said block comprising a plurality of pixels;

computing an average luminance of said block dependent on said average color and a differential luminance of each pixel of said plurality of pixels of said block, wherein differential luminance is the difference in luminance value between each particular luminance value of each pixel of said plurality of pixels and the average luminance value of said block;

providing a first plurality of frequency details of said block by transforming said differential luminance of each pixel of said plurality of pixels of said block;

computing an average color difference between said block and a previous block;

quantizing said average color difference and said first plurality of frequency details; and encoding said quantized average color difference and a second plurality of frequency details, wherein said second plurality of frequency details is less than or equal to said first plurality of frequency details.

2. The method of claim 1 wherein said plurality of pixels comprises $2^k \times 2^k$ pixels.

3. The method of claim 1 wherein k is equal to one.

4. The method of claim 1 wherein said first color space is RGB color space.

5. The method of claim 1 wherein said first plurality of frequency details comprises an average term, a horizontal term, a vertical term, and a diagonal term.

6. The method of claim 5 wherein said second plurality of frequency details comprises said horizontal term and said vertical term.

7. The method of claim 1 wherein said average color difference and said first plurality of frequency details are quantized using Lloyd-Max quantization.

8. The method of claim 7 wherein said Lloyd-Max quantization is dependent on a variance and a number of reconstruction levels.

9. The method of claim 1 wherein said quantized average color and said second plurality of frequency details are encoded using Huffman coding.

10. The method of claim 1 further comprising the step of providing a skip code when said quantized average color difference and said second plurality of frequency details of said block matches a previous block.

11. The method of claim 10 wherein said skip code comprises an entry in a lookup table referencing said previous block.

12. An apparatus for compressing an image, said image comprising a plurality of blocks, comprising:

average color computation means for computing an average color of a block of said plurality of blocks, said block comprising a plurality of pixels;

average and differential luminance computation means coupled to said average color computation means for computing an average luminance of said block dependent on said average color and a differential luminance of each pixel of said plurality of pixels of said block, wherein differential luminance is the difference in luminance value between each particular luminance value of each pixel of said plurality of pixels and the average luminance value of said block;

transform means coupled to said average and differential luminance calculation means for computing a first plurality of frequency details of said block dependent on said differential luminance of each pixel of said plurality of pixels of said block;

average color difference means coupled to said transform means for calculating an average color difference between said block and a previous block;

quantization means coupled to average color difference means for quantizing said average color difference and said first plurality of frequency details; and encoding means for variable length encoding said quantized average color difference and a second plurality of frequency details, wherein said second plurality of frequency details is less than or equal to said first plurality of frequency details.

13. The apparatus of claim 12 wherein said plurality of pixels comprises $2^k \times 2^k$ pixels.

14. The apparatus of claim 12 wherein k is equal to one.

15. The apparatus of claim 12 wherein said first color space is RGB color space.

16. The apparatus of claim 12 wherein said first plurality of frequency details comprises an average term, a horizontal term, a vertical term, and a diagonal term.

17. The apparatus of claim 16 wherein said second plurality of frequency details comprises said horizontal term and said vertical term.

18. The apparatus of claim 12 wherein said quantization means is Lloyd-Max quantization means.

19. The apparatus of claim 18 wherein said Lloyd-Max quantization means is dependent on a variance and a number of reconstruction levels.

20. The apparatus of claim 12 wherein said quantized average color and said second plurality of frequency details are encoded using Huffman coding.

21. The apparatus of claim 12 further comprising a skip code generation means coupled to said quantization means for generating a skip code when said quantized average color difference and said second plurality of frequency details of said block matches a previous block.

22. The method of claim 21 wherein said skip code comprises an entry in a lookup table referencing said previous block.

23. A method for compressing an image of a first color space, comprising the steps of:

dividing said image into a plurality of blocks in image space, wherein said blocks are comprised of a plurality of adjacent pixels in image space;

computing an average color of a block of said plurality of blocks, said block comprising a plurality of pixels;

computing an average luminance of said block dependent on said average color and a differential luminance of each pixel of said plurality of pixels of said block; wherein differential luminance is the difference in luminance value between each particular luminance value of each pixel of said plurality of pixels and the average luminance value of said block;

providing a first plurality of frequency details of said block by Haar transforming said differential luminance of each pixel of said plurality of pixels of said block;

computing an average color difference between said block and a previous block;

quantizing said average color difference and said first plurality of frequency details; and encoding said quantized average color difference and a second plurality of frequency details, wherein said second plurality of frequency details is less than or equal to said first plurality of frequency details.

24. An apparatus for compressing an image, said image comprising a plurality of blocks, comprising:

average color computation means for computing an average color of a block of said plurality of blocks, said block comprising a plurality of adjacent pixels in image space;

average and differential luminance computation means coupled to said average color computation means for computing an average luminance of said block dependent on said average color and a differential luminance of each pixel of said plurality of pixels of said block; wherein differential luminance is the difference in luminance value between each particular luminance value of each pixel of said plurality of pixels and the average luminance value of said block;

Haar transform means coupled to said average and differential luminance calculation means for computing a first plurality of frequency details of said block dependent on said differential luminance of each pixel of said plurality of pixels of said block;

average color difference means coupled to said transform means for calculating an average color difference between said block and a previous block;

quantization means coupled to average color difference means for quantizing said average color difference and said first plurality of frequency details; and encoding means for variable length encoding said quantized average color difference and a second plurality of frequency details, wherein said second plurality of frequency details is less than or equal to said first plurality of frequency details.

25. A method for compressing an image of a first color space, wherein said image is divided into a plurality of blocks, comprising the steps of:

computing an average color of a block of said plurality of blocks, said block comprising a plurality of pixels;

computing an average luminance of said block dependent on said average color and a differential luminance of each pixel of said plurality of pixels of said block, wherein said differential luminance is the difference in luminance value between each particular luminance value of each pixel of said plurality of pixels and the average luminance value of said block;

providing a first plurality of frequency details of said block by transforming said differential luminance of each pixel of said plurality of pixels of said block;

computing an average color difference between said block and a previous block;

quantizing said average color difference and said first plurality of frequency details; and encoding said quantized average color difference and a second plurality of frequency details, wherein said second plurality of frequency details is less than or equal to said first plurality of frequency details.

26. The method of claim 25 wherein said plurality of pixels comprises $2^k \times 2^k$ pixels.

27. The method of claim 25 wherein k is equal to one.

28. The method of claim 25 wherein said first color space is RGB color space.

29. The method of claim 25 wherein said first plurality of frequency details comprises an average term, a horizontal term, a vertical term, and a diagonal term.

30. The method of claim 29 wherein said second plurality of frequency details comprises said horizontal term and said vertical term.

31. The method of claim 25 wherein said average color difference and said first plurality of frequency detail are quantized using Lloyd-Max quantization.

32. The method of claim 31 wherein said Lloyd-Max quantization is dependent on a variance and a number of reconstruction levels.

33. The method of claim 25 wherein said quantized average color and said second plurality of frequency details are encoded using Huffman coding.

34. The method of claim 25 further comprising the step of providing a skip code when said quantized average color difference and said second plurality of frequency details of said block matches a previous block.

35. The method of claim 34 wherein said skip code comprises an entry in a lookup table referencing said previous block.

36. An apparatus for compressing an image, said image comprising a plurality of blocks, comprising:

average color computation means for computing an average color of a block of said plurality of blocks, said block comprising a plurality of pixels;

average and differential luminance computation means coupled to said average color computation means for computing an average luminance of said block dependent on said average color and a differential luminance of each pixel of said plurality of pixels of said block, wherein said differential luminance is the difference in luminance value between each particular luminance value of each pixel of said plurality of pixels and the average luminance value of said block;

transform means coupled to said average and differential luminance calculation means for computing a first plurality of frequency details of said block dependent on said differential luminance of each pixel of said plurality of pixels of said block;

average color difference means coupled to said transform means for calculating an average color difference between said block and a previous block;

quantization means coupled to average color difference means for quantizing said average color difference and said first plurality of frequency details; and encoding means for variable length encoding said quantized average color difference and a second plurality of frequency details, wherein said second plurality of frequency details is less than or equal to said first plurality of frequency details.

37. The apparatus of claim 36 wherein said plurality of pixels comprises $2^k \times 2^k$ pixels.

38. The apparatus of claim 36 wherein k is equal to one.

39. The apparatus of claim 36 wherein said first color space is RGB color space.

40. The apparatus of claim 36 wherein said first plurality of frequency details comprises an average term, a horizontal term, a vertical term, and a diagonal term.

41. The apparatus of claim 40 wherein said second plurality of frequency details comprises said horizontal term and said vertical term.

42. The apparatus of claim 36 wherein said quantization means is Lloyd-Max quantization means.

43. The apparatus of claim 42 wherein said Lloyd-Max quantization means is dependent on a variance and a number of reconstruction levels.

44. The apparatus of claim 36 wherein said quantized average color and said second plurality of frequency details are encoded using Huffman coding.

45. The apparatus of claim 36 further comprising a skip code generation means coupled to said quantization means for generating a skip code when said quantized average color difference and said second plurality of frequency details of said block matches a previous block.

46. The method of claim 45 wherein said skip code comprises an entry in a lookup table referencing said previous block.

* * * * *